C. L. STEELE.
WATER MOTOR.
APPLICATION FILED OCT. 26, 1918.
1,361,111.
Patented Dec. 7, 1920.
2 SHEETS—SHEET 1.
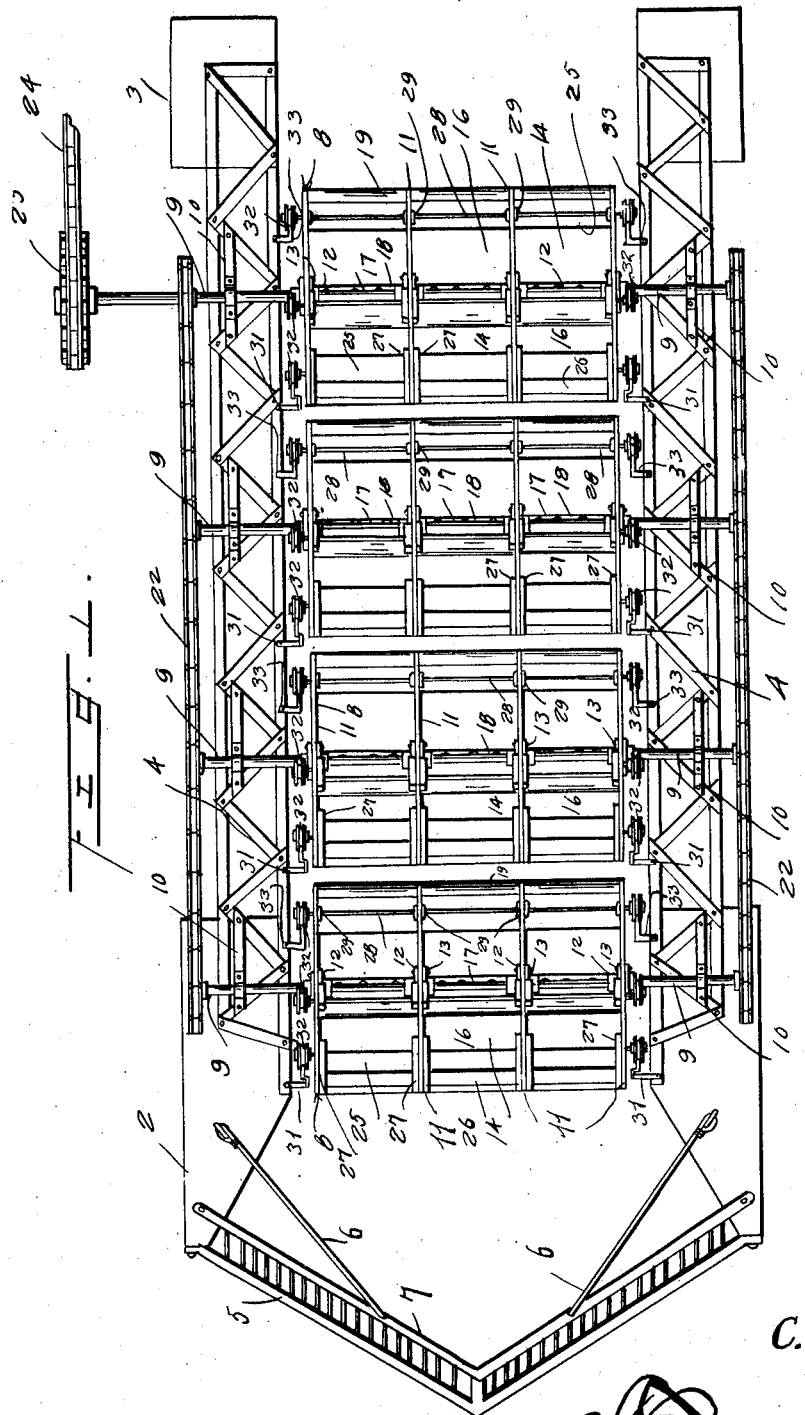
Inventor
C. L. STEELE.
By A. Randolph Jr.
Attorney C. L. STEELE.
WATER MOTOR.
APPLICATION FILED OCT. 26, 1918.
1,361,111.
Patented Dec. 7, 1920.
2 SHEETS—SHEET 2.
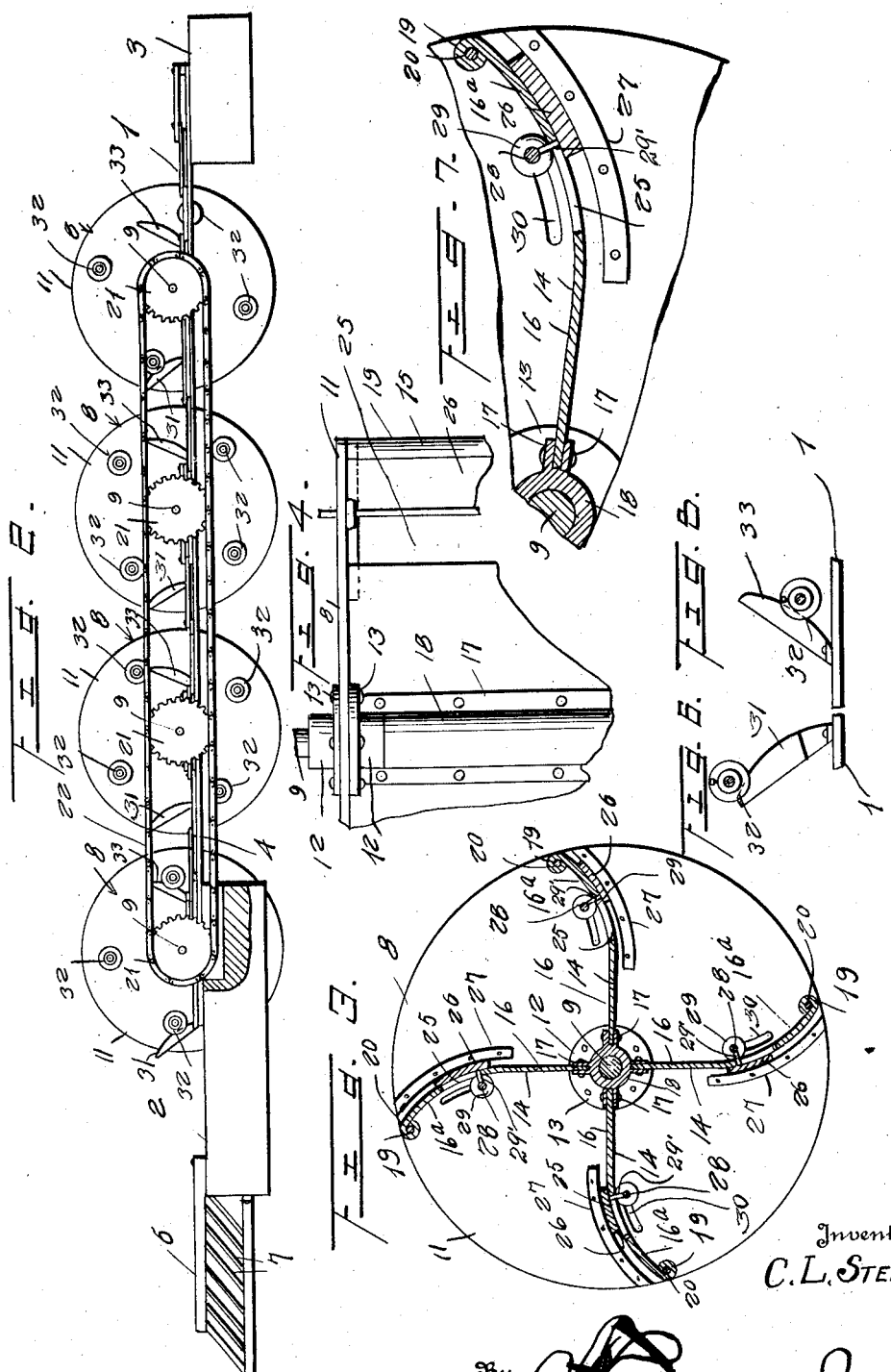
Inventor
C. L. STEELE
Attorney

UNITED STATES PATENT OFFICE.

CLAUDE L. STEELE, OF MUSKOGEE, OKLAHOMA.

WATER-MOTOR.

1,361,111.  Specification of Letters Patent.  Patented Dec. 7, 1920.

Application filed October 26, 1918. Serial No. 259,842.

*To all whom it may concern:*

Be it known that I, CLAUDE L. STEELE, a citizen of the United States, residing at Muskogee, in the county of Muskogee and State of Oklahoma, have invented certain new and useful Improvements in Water-Motors; and I do hereby declare the following to be a full, clear, and exact description of the invention, such as will enable others skilled in the art to which it appertains to make and use the same.

This invention relates to water motors, and more particularly to a motor of that type which is adapted to be operated by a current of water flowing in streams or water ways.

One of the main objects of the invention is to provide a motor of the character stated of simple construction and high efficiency which may be readily mounted or anchored in a stream or water way so as to be actuated by the water flowing therethrough.

A further object is to provide a motor having a plurality of power generating elements or wheels provided with blades which are so relatively disposed upon the different wheels as to insure smooth and uniform operation of the motor so as to reduce vibration to a minimum and obtain maximum power.

A further object is to provide means whereby the blades of the motor elements may be freed of the water supported on the upper surfaces thereof when the blade reaches such a position as to tend to retard rotation of the wheel, thus preventing loss of power due to lifting water which is not used to generate power.

Further objects will appear from the detailed description.

In the drawings:

Figure 1 is a top plan view of a water motor constructed in accordance with my invention.

Fig. 2 is a side view.

Fig. 3 is a transverse section through one of the paddle wheels.

Fig. 4 is a detail of the valve and the mounting therefor for one of the blades.

Fig. 5 is a detail of one of the eccentric guide members for operating the valve rod and associated parts showing the relative positions of the rod, and the blade and the valve.

Fig. 6 is a similar view of the other eccentric guide member.

Fig. 7 is a fragmentary transverse section of one of the paddle wheels showing a blade approaching the surface of the water with the valve opening to discharge the water from the upper surface of the blade.

The supporting structure designated generally by 1 comprises up-stream float members 2 and down-stream float members 3, the floats 2 and 3 being rigidly secured together by truss-beams 4 positioned at each side of the structure. As will be noted more clearly from Fig. 1 of the drawings, the outer end portions of the floats 2 are shaped to provide an inwardly converging passageway for directing the water between these floats, the water passing longitudinally of the supporting structure and being discharged therefrom between the rearward or down-stream floats 3. A substantially V-shaped frame 5 is secured to the floats 2 adjacent the outer ends thereof and projects in advance of these floats, this frame being supported in proper position by guy wires 6 secured thereto and to the floats or in any other suitable manner. Frame 5 is provided with a plurality of depending spaced parallel rods 7 which extend below the surface of the water, these rods forming a grillwork or fender which serves to prevent entry of debris into the supporting structure such as would cause injury to the paddle wheels.

The structure designated generally by 1 supports a plurality, in this instance four, of paddle or power wheels designated generally by 8. Each of these paddle wheels is provided with a supporting shaft 9 which extends transversely of the supporting structure and is rotatably mounted in suitable bearing blocks 10 secured to the trussbeam 4 and provided with suitable antifriction bearings. A plurality of sheet metal disks 11 are secured on shaft 8, these disks being disposed equidistant longitudinally of the shaft. A securing sleeve 12 is secured to shaft 8 adjacent each face of the disk, this sleeve being provided with an outwardly extending peripheral flange 13 which fits snugly against the disk, these flanges being secured to the disk and to each other by riveting or in any other suitable manner. The disks 11 receive between them the paddles or blades 14 which are secured at their ends to the disks in any suitable manner. Each of these blades is provided with an inner straight portion 16 which projects radially from the shaft 8, the inner edge of this blade being secured to a flange 17 which projects substantially radially from a tubular supporting member 18 mounted on the shaft between disks 8. In practice, there are four of these blades provided for each wheel, though it will be evident that the number of blades may be varied to suit conditions. The outer portion 16$^a$ of blade 14 is of arcuate shape being curved substantially on the arc of a circle, and the outer edge portion of the blade is turned over to form a bead 19 which is secured about a brace rod 20 secured through the disks 8.

As will be noted clearly from Fig. 3 of the drawings, the concave surface of the curved portion 16$^a$ of blade 14 is directed down-stream or in the direction of rotation of the wheel under the influence of the current of water. Also, the four wheels shown are so related that the blades of each successive wheel are in advance of the blades of the preceding wheel. This insures that at least one blade will, at any given time, be in such position as to be acted upon by the flowing stream of water to best advantage thus developing in the wheel carrying that particular blade at that time maximum power, the blades of the other wheels being raised in succession and at a uniform rate into inoperative position so as to coact with the wheel carrying the blade which is in full operative position in such manner as to generate maximum power.

The shaft 9 of each of the power wheels is extended beyond the bearings 10 and has secured on each end thereof a sprocket wheel 21. A sprocket chain 22 is passed about all of the sprocket wheels at each side of the motor so as to operatively connect all of these power wheels which act in the manner above set forth to generate relatively great power, and due to the relative disposition of the blades of the wheels, eliminate all unnecessary vibration. The shaft 9 of the last or down-stream wheel of the series is extended at one end so as to project beyond the sprocket wheel 21, and is provided with a drive sprocket wheel 23 secured thereon and adapted to be connected by a chain 24 to a machine which it is desired to operate from the motor. It will be understood, of course, that any other suitable means may be employed for connecting this motor to a machine which it is desired to operate thereby.

Blade 14 is provided with an opening 25 extending the full width thereof, this opening being provided in the outer arcuate portion 16$^a$. A plate valve 26 is slidable on the convex surface of portion 16$^a$ of the blade, this valve being operative between the blade and angular guide strips 27 secured to the disks 8 at each end of the blade concentric with the curved portion 16$^a$. This valve plate is held in snug engagement with the blade by means of strips 27 and is slidably supported so as to be movable over the opening 25. A valve rod 28 is inserted through the slot 30 and an eye member or roller 29 which rides on the blade and said rod is connected to the valve 26 by an arm 29' which extends through the opening 25. This rod is operative in arcuate slots 30 provided through the disks 11 concentric with the curved portion of blade 14 so that, by shifting rod 28 in proper direction, valve 26 may be moved into position to cover or uncover the opening 25, as desired. In practice, the valve is moved into closed position as the blade enters the water, being moved into open position slightly prior to the blade leaving the water so as to permit the water on the upper surface of the blade to flow through opening 25 thus preventing interference with rotation of the wheel due to water supported on the upper surface of the blade after this blade has been lifted out of the water.

On the up-stream side of each of the power wheels 8, and adjacent each end thereof, I provide a valve rod operating device or eccentric guide member 31 the upper surface of which is curved or arched on an arc eccentric to the axis of the wheel, as shown. These members 31 are adapted to be engaged by rollers 32 secured on the ends of the valve rod 28 which project beyond the end disk 11 of the wheel. These guide members are so positioned as to actuate the rod to move the valve 26 into such position as to cover the opening 25 of the blade prior to this blade entering the water. At the other side, or down-stream side, of the wheel, I provide two members 33 which correspond to the members 31 and are so positioned as to move the valve rod outwardly so as to uncover the opening 25. As will be noted, these members 33 are so positioned as to move the valve 26 into open position as a blade approaches the surface of the water, the water upon the upper surface of this blade being supported within the arcuate or cup like portion 16$^a$ of blade 14. By opening the valve at this time, all of the water upon the upper surface of the blade is readily discharged through the opening 25 thus effectually preventing interference with free rotation of the wheel. As will be clear, the paddle wheels are supported by the supporting structure so that the shafts 9 thereof are positioned substantially at the water line thus insuring maximum efficiency, the water upon the upper surface of each blade being discharged preliminary to this blade leaving the water and while the blade is still at a slight downward and rearward inclination so as to be acted upon to advantage by the flowing water of the stream. This effectually eliminates all back pressure such as occurs where the blades are not provided with means for discharging the water from the upper surfaces thereof in the manner described.

While I have illustrated but four power wheels carried by the supporting structure, it will be understood that the number of power wheels employed may be varied as required. Also, if desired, the truss-beams 4 may be used to support depending side walls which coöperate with the end floats to provide a flume extending the full length of the motor so as to insure more positive action.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In a water motor, a supporting structure, a power wheel rotatably supported thereby and provided with a plurality of radiating blades so as to be rotated by the engagement of water flowing through the structure with said blades, each of said blades having its outer portion curved in the direction of rotation of the wheel and this curved portion being provided with a discharge opening, means for closing said opening as the blade enters the water, and means for uncovering said opening prior to the blade leaving the water so as to discharge from the upper surface of the blade water supported thereby through the opening.

2. In a water motor, a supporting structure, a power wheel rotatably supported thereby so as to have its axis positioned closely adjacent the water surface when said structure is mounted upon the surface of a stream, said wheel being provided with a plurality of radiating blades adapted to be engaged by water flowing through said structure so as to cause rotation of the wheel, each of said blades having its outer portion curved in the direction of rotation of the wheel and provided with a water discharge opening, a valve slidably supported adjacent the curved portion of the blade and movable over said opening so as to cover or uncover the same, means for moving said valve into closed position prior to the blade entering the water, and means for moving the valve into open position so as to uncover said opening as the blade leaves the water for the purpose of discharging through said opening water positioned upon the upper surface of the curved portion of said blade.

3. In a water motor, a supporting structure, a shaft rotatably supported thereby, disks secured on said shaft, blades secured between said disks and disposed substantially radially of the shaft for causing rotation of said shaft when engaged by water flowing through the supporting structure, each of said blades being provided with an outer curved portion curved in the direction of rotation of said shaft, said curved portion being provided with a water discharge opening, a plate valve slidably supported by said disk closely adjacent the curved portion of the blade for movement thereover so as to cover or uncover said opening, a valve rod connected to said plate valve and supported in slots through the disk concentric with the curved portion of the blade, said rod being extended beyond the disk, and valve rod actuating members carried by the supporting structure and positioned at opposite sides of the axis of the shaft, said members being so positioned as to move the valve rod in such direction as to move the valve over said opening to close the same as the blade enters the water, the valve rod being moved so as to uncover said opening as the blade leaves the water and discharge therethrough water supported upon the upper face of the blade.

In testimony whereof I affix my signature in presence of two witnesses.

CLAUDE L. STEELE.

Witnesses:
J. A. LATHIM,
GEO. H. LESSLEY.